Oct. 2, 1962 G. L. HAZEN ET AL 3,056,553
TEMPERATURE AND HUMIDITY CONTROL SYSTEMS
FOR AIR-CONDITIONED CABINETS
Filed April 24, 1957 3 Sheets-Sheet 1

INVENTORS
GRETZOLON L. HAZEN
ARTHUR W. THEILIG
BY
Wheeler, Wheeler & Wheeler
ATTORNEYS

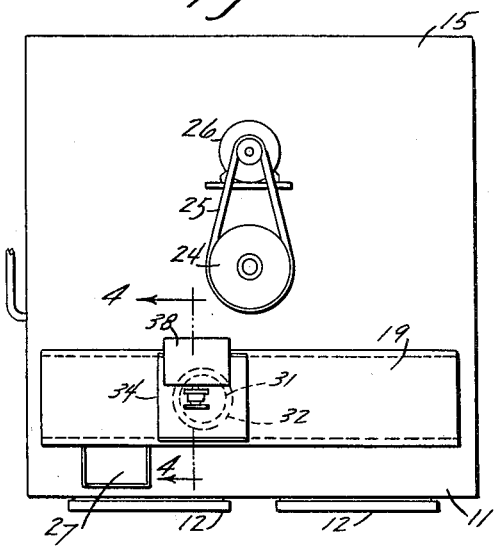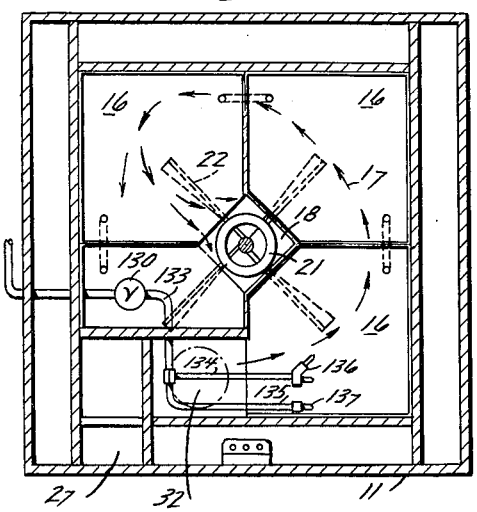

Oct. 2, 1962

G. L. HAZEN ET AL 3,056,553

TEMPERATURE AND HUMIDITY CONTROL SYSTEMS
FOR AIR-CONDITIONED CABINETS

Filed April 24, 1957

INVENTORS
GRETZOLON L. HAZEN
BY ARTHUR W. THEILIG

Wheeler, Wheeler & Wheeler
ATTORNEYS 3,056,553
TEMPERATURE AND HUMIDITY CONTROL SYSTEMS FOR AIR-CONDITIONED CABINETS
Gretzolon L. Hazen and Arthur W. Theilig, Fort Atkinson, Wis., assignors, by mesne assignments, to Rockwood & Co., Chicago, Ill., a corporation of Delaware
Filed Apr. 24, 1957, Ser. No. 654,828
10 Claims. (Cl. 236—3)

This invention relates to improvements in temperature and humidity control systems for air-conditioned cabinets and particularly egg incubating cabinets.

Air-conditioning loads vary according to the surrounding air temperature and humidity. In an incubator, the load further varies according to the heat required by the eggs during the initial incubating period and according to the heat and moisture given off by the eggs during the final period of incubation preliminary to hatching. During the initial incubating period, the eggs absorb heat and such heat must be supplied thereto by external means. During the final incubating period prior to hatching, the eggs produce heat which may be more than sufficient to maintain the desired heat level in the cabinet, thus requiring cooling of the cabinet to maintain the proper temperature.

The temperature within the cabinet must be controlled within very close limits. Heretofore, it has been conventional to provide thermostatic control operable within a temperature range. In any such control system in which the temperature is permitted to range, even slightly, it is possible for the average temperature to be too high, thus causing reduction in the hatchability of the eggs. In the present invention, the temperature is very closely controlled by a single thermostat which is set to maintain the temperature substantially without range at the optimum level determined to be appropriate for the eggs.

The control system of the present invention is applied generally to the type of incubator cabinet shown in prior Patent 2,603,182. In such cabinets, all eggs are placed in the cabinet at the same time and hatch at the same time. Accordingly, all eggs are incubated under substantially identical conditions. Adjustments made both in humidity and temperature affect all eggs in the same manner.

In the control method and apparatus of the present invention, the application of heat to the cabinet and dissipation of heat from the cabinet are interrelated in such a way that the transition from the initial incubation period during which the eggs absorb heat to the final period of incubation during which the eggs give off heat is accounted for automatically.

In the device of the present invention, fresh air is constantly supplied to the cabinet to furnish sufficient oxygen to the eggs and remove $CO_2$. During the initial incubating period, the heating means supplies enough heat to the cabinet to satisfy the demand of the eggs for heat and replace the heat lost by air circulation. In the final incubating period, the heating means will ordinarily be deenergized as the heat given off by the eggs will be adequate to replace the heat lost by air circulation and still maintain the cabinet at optimum incubating temperature. During the final incubation period, the heat dissipating means removes any excess heat generated by the eggs. Regardless of the period during the cycle of incubation, the control system of the present invention will selectively actuate the heating means or the heat dissipating means to maintain cabinet temperature at the level for which the thermostat is set.

As will hereinafter appear, the humidity within the cabinet is also controlled in such a manner that the cabinet temperature is not materially changed when moisture is introduced into the cabinet. Alarm apparatus is also provided and in integrated with the temperature control to automatically deenergize the heating means and energize the heat dissipating means in the event the temperature level within the cabinet rises to an excessive level.

In the specific embodiment illustrated herein, the means for dissipating heat consists in regulating the amount of outside air which is admitted to and discharged from the cabinet. The outside air is ordinarily at a lower temperature than the air within the cabinet. Accordingly, it functions as a cooling means. If desired, heat can be dissipated by provision for a refrigerating coil in place of or in addition to the air circulating means. However, inasmuch as it is desirable to constantly replace the air in the cabinet to supply oxygen to the eggs and remove carbon dioxide given off by the eggs, the disclosed embodiment is preferred in that it combines the function of air circulation and oxygen supply with heat dissipation.

Other features and advantages of the invention will be more apparent upon examination of the following disclosure.

In the drawings:

FIG. 2 is a plan view of the device of FIG. 1.

FIG. 3 is a cross sectional view taken along the line 3—3 of FIG. 1.

FIG. 7 is a diagrammatic view of the control apparatus including a simplified electrical circuit diagram therefor.

FIG. 8 is a perspective view of the damper and control, portions being broken away to expose details.

FIG. 9 is a perspective view of the thermostat and humidistat mounting panel.

FIG. 10 is an enlarged view of a typical thermometer thermostat element.

FIG. 11 is a fragmentary perspective view of the damper cable drum shown in spaced apart relation to the abutment which limits drum rotation.

Figure 1:
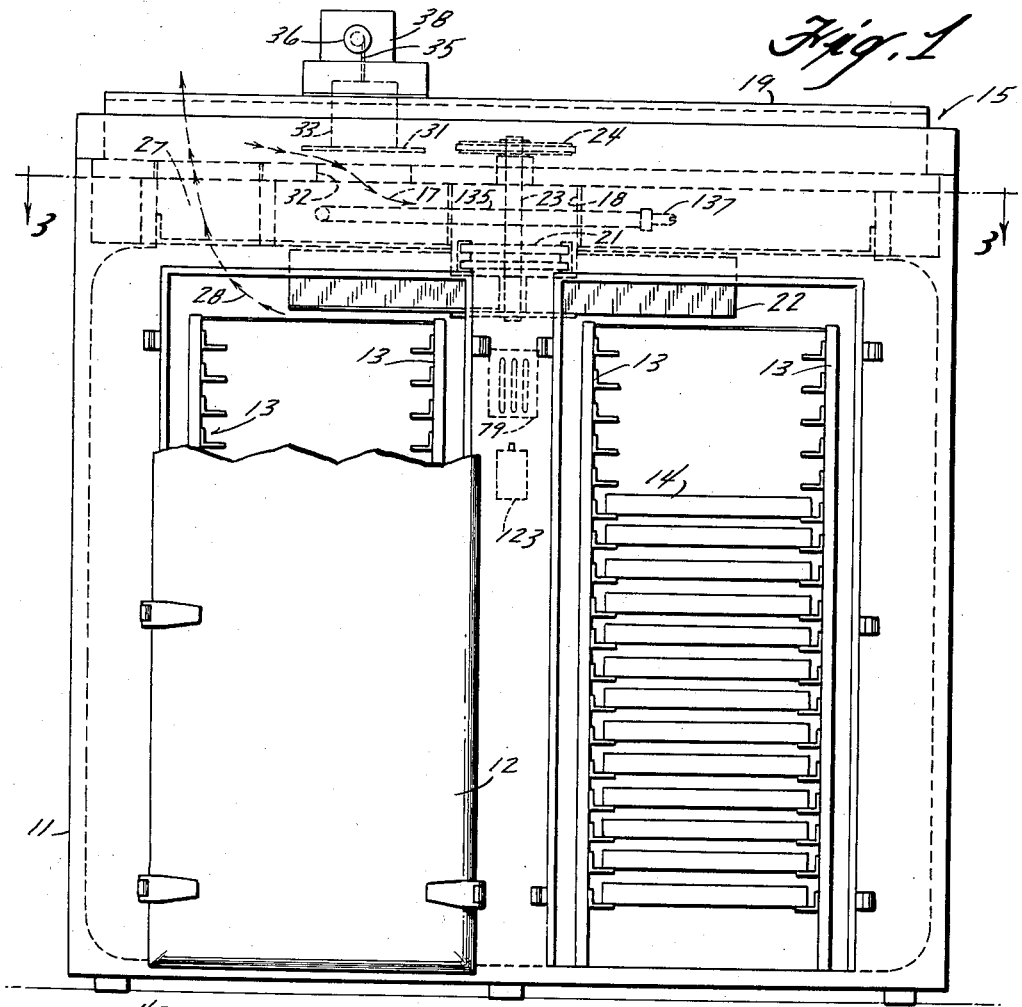
FIG. 1 is a front elevation of an incubator embodying the present invention, one door being removed and the other door being partially broken away to expose interior details.

The air-conditioned incubator cabinet 11 shown in FIGS. 1, 2 and 3 is basically similar to the one shown in prior Patent 2,603,182 aforesaid. The cabinet has double doors 12. The interior of the cabinet is provided with vertical racks 13 for the support of removable egg trays 14.

The top cap 15 of the cabinet is compartmented as best shown in FIG. 3 to pass air admitted through the duct 19 and intake port 32 over humidifying pans 16. The path of the incoming air is indicated by arrows 17. The air proceeds downwardly through the central port 18, past the heating element rings 21 into the egg storage compartment of the cabinet. Incoming air is impelled by the fan 22 which has a shaft 23 driven from pulley 24 by belt 25 which passes over the armature pulley of motor 26. As in prior Patent 2,603,182 aforesaid, the fan distributes the air radially to the outside of the stacked shelves, downwardly and inwardly thereunder and centrally upwardly between the stacked shelves for partial recirculation and partial discharge through the exhaust port 27 along the path of the arrows 28.

The amount of air discharged from the cabinet will depend upon the position of the damper 31 with respect to intake port 32. The damper 31 has a sleeve 33 which guides its movement in the air duct collar 34 as best shown in FIG. 8. The damper 31 is supported by a cable 35 connected at its lower end to a cross rod 39 which extends across the sleeve 33, the cable being wound around a hoist drum 36 mounted on shaft 37 geared to the armature shaft of electric motor 38. Cross rod 39 also carries an indicator rod 41 having a pointer 42 which extends through a slot 43 in a plate 44 which carries graduated markings 40 along the slot to indicate visually the position of the damper with respect to the port 32. For convenience, the graduations indicate the separation in inches of the damper 31 from port 32.

The housing wall 45 for the motor 38 is provided with a stop abutment 46 which projects into the path of the stop member 47 mounted on drum 36. Accordingly, the drum 36 is limited to less than 360° rotation. The length of cable 35 is adjusted so that in the lowermost position of the damper will be approximately one-half inch clearance between the damper 31 and port 32. In the uppermost position of the damper there is approximately a two inch clearance between the damper and port 32. The motor 38 is of the conventional stall type and is not damaged by locking its shaft 37 in the respective extreme positions of the damper as aforesaid.

The other end of shaft 37 carries a cam 48 having a mutilated portion 51. The roller 52 on pivoted arm 53 which carries mercury switch 54 rides on the cam to govern the operation of the switch 54 as hereinafter explained. Accordingly, the position of the cam is related directly to the position of the damper and, as will hereinafter appear, the switch 54 will close only when the damper is in its extreme lowermost position, or nearly so.

The control system for the incubator can best be described in connection with FIG. 7 which shows for exemplification a simplified electric circuit. Control voltage is supplied to electric input leads 55, 56, lead 56 being grounded. Motor 38 receives energizing power from line 55 through line 57 and ground return line 58. As long as power is supplied, the motor will apply torque to the shaft 37. The direction of rotation of the motor 38 is controlled by circuit 61. If circuit 61 is closed through series connected mercury switches 62, 63, the motor operates in a direction to lower damper 31, thus reducing the amount of air admitted to the cabinet and reducing the dissipation of heat therefrom. When either or both of mercury switches 62, 63 are open, the motor will reverse direction and wind in on cable 35 to lift the damper 31 and permit a greater flow of air through the cabinet, thus increasing dissipation of heat therefrom. Accordingly, the capacity of the heat dissipating means will vary in accordance with the position of the damper.

The speed reduction effected in the gearing between the armature of motor 38 and the cam drum shaft 37 is such as to drive the drum 36 at a very slow rate. In practice, it takes several minutes for the drum 36 to move the damper from one extreme position to another. During that period of time, the control system may act one or more times or repeatedly to reverse the direction of rotation of the motor, thus tending to position the damper at exactly the proper spacing from port 32 to provide just the right amount of air to maintain the temperature of the cabinet at the level set by the thermostat. In either extreme position of the damper, the motor 38 will simply stall and remain in readiness for reverse rotation.

As shown in FIGS. 7 and 9, three thermometers 64, 65 and 66 mounted on thermostat panel 79 have a common connection with lead 55 through line 67. Thermometer 66, labeled A, governs the operation of the alarm circuit hereinafter explained in more detail. Thermometers 64 and 65, labeled H and L, respectively, comprise high temperature and low temperature thermostats which may be selectively cut into the circuit by means of the selector switch 68. The thermostat circuit is completed from either thermometer 64, 65 through switch 68 to line 69, relay 72 and ground return 73.

The thermometers 64, 65 and 66 are desirably of the mercury type also shown in FIG. 10. Each thermometer has molded therein metallic contacts 74, 75. These contacts align with and engage spring couplings 76 on the thermostat panel 79. The lowermost couplings 76 are mounted on bus bar 78 which ties the respective bottom contacts of the thermometer together as shown in FIG. 7. The uppermost couplings are connected independently to circuits controlled thereby.

High stage and low stage thermometers 64, 65 are provided to accurately control the temperature in the cabinet respectively during the two periods of egg incubation, namely, the initial period in which the eggs require heat and the final period before hatching when the eggs give off heat. The alarm thermometer 66 guards against such a rise of temperature as will injure the eggs. For example, for a chicken egg incubator, alarm thermometer 66 is set to complete the alarm circuit when the temperature within the cabinet reaches 100.5° F. High stage thermometer 64 is set for 100° F. Low stage thermometer 65 is set for 98.8° F. For a turkey egg incubator, the alarm thermostat is set for 100.5° F. The high stage thermometer 64 is set for 99.75° F. and the low stage thermometer is set for 99° F. The operator will actuate switch 68 to change from the high stage to the low stage thermometer at the appropriate time in the incubation cycle between the initial incubation period and final incubation period aforesaid. For chicken eggs, switch 68 is actuated on the fourteenth day of incubation and for turkey eggs the switch is actuated on the sixteenth day of incubation.

Figures 4, 5, 6:
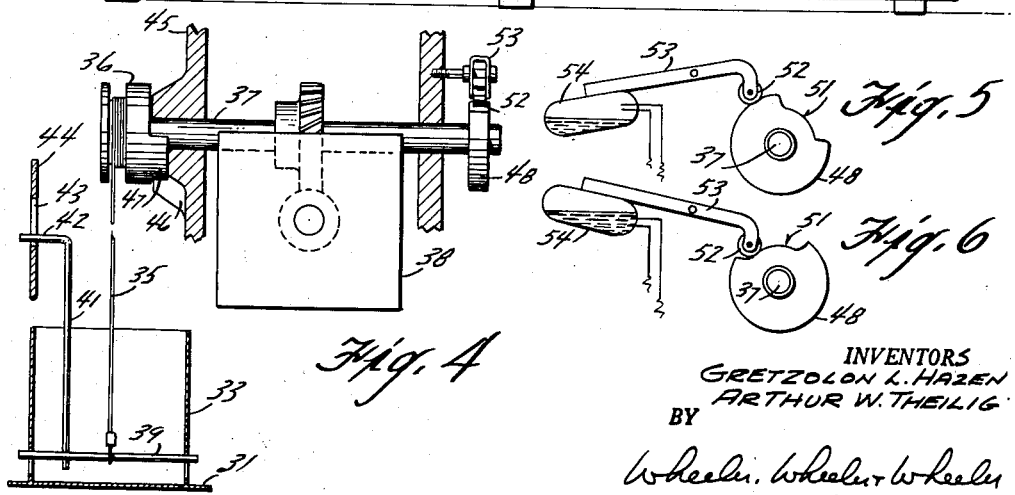
FIG. 4 is a fragmentary enlarged cross section taken along the line 4—4 of FIG. 2, the motor being shown diagrammatically.
FIG. 5 is a diagrammatic fragmentary view of the control cam shown in one position.
FIG. 6 is a view similar to FIG. 5 showing the control cam in a different position.

The appropriate thermometer 64, 65 controls relay 72, which has a relay contactor 82 in line 83 which supplies solenoid 84. The armature of solenoid 84 is coupled at 85 to a platform 86 which is tiltable about pivot 95 and on which are mounted mercury switches 62, 87 and 88. Mercury switch 62 controls the direction of rotation of motor 38 as hereinbefore described. Mercury switch 87 is in series with mercury switch 54 and with lines 91, 92, 93 and ground return line 94 supplying the heating element ring 21. In the position of the parts shown in FIGS. 6 and 7 in which both mercury switches 87 and 54 are closed, heat ring 21 is energized and supplies heat to the cabinet 11. Switch 87 is closed only when the appropriate thermometer 64, 65 is open and calling for heat. Mercury switch 54 is closed only when roller 52 is in the mutilated portion 51 of the cam 48 as shown in FIG. 6. This is possible only when the damper 71 is in its extreme lowermost position at the one-half inch spacing from intake port 32 for minimum heat dissipation from the cabinet.

Assuming by way of example that the temperature in the cabinet rises sufficiently to satisfy the appropriate thermostat 64, 65, the circuit to relay 72 is completed, thereby closing the circuit to solenoid 84 which tilts the platform 86 about its pintle 95 to open mercury switch 87. This opens the circuit to the heat ring 21 which is deenergized. Concurrently, mercury switch 62 opens to reverse the direction of rotation of motor 38 to wind up cable 35 and increase the opening of damper 31. At the same time, cam 48 turns clockwise from its position shown in FIG. 6 to lift the cam roller 52 onto the cam surface as exemplified in FIG. 5, thus opening switch 54 and disabling or interlocking the circuit from reenergizing the heating ring 21 until the damper is again in its extreme lowermost position to restore the parts to their positions shown in FIG. 6.

As afore stated, it takes several minutes for the damper to move from one extreme position to the other. During the course of its upward movement in the preceding example, the temperature within the cabinet may drop sufficiently to open the appropriate thermometer 64, 65 in the circuit to relay 72, thus deenergizing solenoid 84 and allowing the platform 86 to pivot to its position shown in FIG. 7. This recloses switch 62 to reverse the direction of rotation of motor 38 and lowers damper 31 toward port 32. Switch 87 is also reclosed but since switch 54 is open the heat ring 21 will not be energized. Damper movement may continue until it reaches extreme lowermost position at which time the roller 52 will drop into the mutilated portion 51 of the cam 48 as shown in FIG. 6 to close switch 54, thus to release the interlock and reenergizing the heating element 21.

If, before the damper is completely closed, the reduction of heat dissipation caused by reducing circulation of air allows the temperature to rise sufficiently in the cabinet to satisfy the appropriate thermometer 64, 65, the circuit to relay 72 will close and platform 86 will pivot to its position where switches 87 and 62 will open. The motor 38 will again reverse. Under such circumstances, the damper may simply hunt within a narrow range and heat ring 21 will not be energized because switch 54 will not reclose in the range of hunting movement of the damper 31. Under these circumstances, the temperature within the cabinet is controlled solely by regulating the volume of air which is permitted to pass through the port 32. The foregoing sequence ordinarily obtains during the final period of incubation when the low stage thermometer 65 regulates temperature. During this period, considerable electricity is saved in that the heat ring 21 is rarely used and the heat given off by the eggs is ordinarily sufficient to maintain the temperature within the cabinet at a level high enough to satisfy the low stage thermometer 65.

During the initial period of incubation when the eggs absorb heat the high stage thermometer 64 will ordinarily be satisfied only when the heat ring 21 is continuously or intermittently energized.

If the appropriate thermometer 64, 65 is satisfied to the extent that heat ring 21 is deenergized and damper 31 is opened completely and the temperature in the cabinet continues to increase (for example, if the temperature of the outside air is so high as to be ineffective to cool the cabinet), alarm thermostat 66 may be satisfied to close a circuit through line 96 to relay 97 and ground line 98. Operation of relay 97 will close contactor 101 in the circuit from line 55 through lines 102, 103, solenoid 105 and ground return line 104. The armature of solenoid 105 is coupled at 106 to a platform 107 which tilts about pintle 110 and on which mercury switches 63 and 108 are mounted.

Under ordinary conditions mercury switch 63 is normally closed to complete circuit 61 subject only to the functioning of switch 62. However, under conditions of excess heat such as will satisfy the alarm thermometer 66, mercury switch 63 opens, thus automatically requiring motor 38 to open the damper 31 to its widest position. In the course of this movement, switch 54 will open as aforedescribed to preclude energization of heat ring 21.

Concurrently therewith, mercury switch 108 closes to complete a circuit through line 109, 112, energy source such as the battery 113 and line 114 to the alarm bell 115. A pilot light 111 may optionally be connected in parallel with the alarm bell 115. Accordingly, the operator is immediately apprised of the overheated condition of the incubator and can take remedial action.

The alarm bell and pilot light are in parallel with lines 116, 117 which are series connected to a door switch 118 and a sail switch 119 which has a vane 122 in the path of air impelled by the fan 22. Switch 118 is closed only when the doors 12 are closed. The sail switch 119 is normally held open by the pressure on its vane 122 of air circulated by the fan 22. If, by reason of power failure or otherwise, fan 22 fails to circulate air, the pressure on the vane 122 is relaxed and switch 119 is biased to close, thus completing a circuit to the alarm bell 115 through the battery 113 and the line 116, 117. When the door is opened, the alarm circuit is opened subject to automatic reclosing of door switch 118 to automatically reset the alarm circuit for operation subject to the sail switch 119.

The humidity within the cabinet is controlled by a humidistat 123 which may be of any conventional type commercially available. The humidistat operates a relay 124 in lines 125, 126 through the mercury cut-out switch 88 and line 127 through solenoid 129 and ground return line 128. Solenoid 129 actuates water valve 130 in water supply line 133 which is branched at 134, 135 as shown in FIG. 3 to supply water spray nozzles 136, 137 positioned over pans 16 in the path 17 of incoming air. Accordingly, when the humidistat 123 calls for additional moisture, valve 130 will supply water to the nozzles 136, 137 provided switch 88 is closed. Switch 88 is interlocked with switch 87 in the heat ring circuit. Switch 88 will close only when switch 87 is open. Accordingly, valve 130 will supply water to the nozzles only when the heat ring 21 is deenergized.

The foregoing arrangement in which nozzles spray moisture into the air only when the heat element is off prevents temperature drop caused by rapid evaporation of moisture as the moisture-laden air passes the heat ring 21 at a time when the cabinet is deficient in heat. Moisture is added only when the appropriate thermometer 64, 65 has been satisfied. Thus the added heat load required to evaporate water is not imposed at a time when the cabinet also needs heat for incubation purposes.

As soon as the thermostat calls for heat, mercury switch 88 opens to disable the moisture supplying apparatus. Accordingly, the device can respond quickly to the demand of the thermostat, deferring the addition of moisture to such time as the thermostat has been satisfied.

We claim:

1. In an air-conditioned cabinet having heating means and humidifying means, apparatus for controlling the temperature and humidity within said cabinet comprising first means including a thermostat for selectively actuating said heating means, second means including a humidistat for selectively actuating said humidifying means, and means interlocking said first and second means for disabling said humidifying means whenever said thermostat calls for heat.

2. The device of claim 1 in which said first and second means comprise mercury switches, the interlocking means comprising means for tilting said switches to close one switch concurrently with opening the other switch.

3. Temperature control apparatus for an incubator cabinet containing eggs which require heat in one stage of incubation and which produce heat in another stage of incubation, said cabinet having heating means and variable capacity heat dissipating means including means to control the temperature of the cabinet during said other stage independently of the heating means and solely according to the capacity at which it is operated, said apparatus comprising first means for operating the heat dissipating means through a range of different heat dissipating capacities and which requires several minutes to traverse said range, second means including a thermostat for actuating the heating means and including time delay means in addition to the thermostat and responsive to the condition of the heat dissipating means to interlock said heating means against actuation for any portion of the period of time required for the heat dissipating means to operate through its range and until said heat dissipating means operates at substantially minimum capacity whereupon the interlock is released.

4. The device of claim 3 in which said apparatus further comprises an electric circuit, said second means comprising series connected switches, said thermostat having actuating means connected to one of said series connected switches to actuate said switch according to the demand of said thermostat, said time delay means being connected to the other said series connected switch to actuate the switch in accordance with the condition of the heat dissipating means.

5. The device of claim 4 in which said first means comprises a switch in said electric circuit, and electrically operated switch actuating means operatively connecting said switch with said one of said series connected switches for their concurrent actuation to alternate positions to condition said heating means and said heat dissipating means for alternate operation.

6. The device of claim 5 in which said thermostat has a single contact in said circuit which when made will complete a circuit to the switch actuating means to position the said switches operatively connected thereto in one alternate position and which when broken will position said switches in their other alternate position.

7. Temperature control apparatus for an incubator cabinet having heating means and heat dissipating means, said apparatus comprising an electric circuit, heat sensitive means for opening and closing the circuit in accordance with the temperature within the cabinet, a relay in said circuit, first and second switches respectively connected to said heating means and said heat dissipating means for conditioning said heating means and said heat dissipating means for operation, and means actuated by said relay for concurrently actuating said switches to alternately condition said heating means and said heat dissipating means for operation in further combination with humidifying means including a cut out switch, said cut out switch being connected to said relay actuated means for conditioning the humidifying means for operation in alternation to the switch which actuates the heating means and thereby interlock said humidifying means against actuation when the heat sensitive means calls for heat.

8. Temperature control apparatus for an incubator cabinet having heating means and heat dissipating means, an electric motor for operating the heat dissipating means, said apparatus comprising electric circuits including first and second switches respectively connected to said heating means and said motor for controlling the operation thereof, heat sensitive means for opening and closing said switches in accordance with the temperature within the cabinet, alarm means, an alarm thermostat, circuit means connecting the alarm thermostat to the alarm means to actuate the alarm means when the temperature rises to the level for which the alarm thermostat is set and a third switch in the circuit to the motor and also responsive to said alarm thermostat for actuating said motor at said temperature, the electric circuit for said motor including a reversing circuit including said second and third switches, one of said switches being subject to the control of the temperature thermostat and the other switch being subject to the control of the alarm thermostat.

9. Temperature control apparatus for an incubator cabinet containing eggs which require heat in one stage of incubation and which produce heat in another stage of incubation, said cabinet having heating means and variable capacity heat dissipating means including means to control the temperature of the cabinet during said other stage independently of the heating means and solely according to the capacity at which it is operated, said apparatus comprising first means for operating the heat dissipating means through a range of different heat dissipating capacities and which requires several minutes to traverse said range, second means including a thermostat for actuating the heating means and time delay means in addition to the thermostat and responsive to the condition of the heat dissipating means to interlock said heating means against actuation for any portion of the period of time required for the heat dissipating means to operate through its range and until said heat dissipating means operates at substantially minimum capacity whereupon the interlock is released, said heat dissipating means comprising an air intake to the cabinet, a damper therein and a motor, said time delay means comprising time delay motion transmitting connections from the motor to the damper and means responsive to the position of the damper to operate the said interlock.

10. The device of claim 9 in which said motion transmitting connections comprise a shaft powered by the motor, a drum, and a cable wound on said drum and connected to the damper.

References Cited in the file of this patent

UNITED STATES PATENTS

| 510,017 | Gassett | Dec. 5, 1893 |
| 1,101,742 | Hays | June 30, 1914 |
| 1,368,562 | Kitchen | Feb. 15, 1921 |
| 1,756,688 | Hutchinson | Apr. 29, 1930 |
| 1,968,355 | Schaefer | July 31, 1934 |
| 2,067,426 | Stuart | Jan. 12, 1937 |
| 2,103,904 | Hill | Dec. 28, 1937 |
| 2,160,381 | Cruikshank | May 30, 1939 |
| 2,226,510 | Grant | Dec. 24, 1940 |
| 2,291,145 | Buck | July 28, 1942 |
| 2,329,473 | Landon | Sept. 14, 1943 |

FOREIGN PATENTS

| 587,859 | Great Britain | Feb. 25, 1946 |